United States Patent [19]

Beckershoff

[11] 4,078,812

[45] Mar. 14, 1978

[54] COMBINED SEAL AND GUIDE ARRANGEMENT FOR TWO COAXIALLY ARRANGED MACHINE PARTS

[75] Inventor: Wolfgang Beckershoff, Aarau, Switzerland

[73] Assignee: BBC Brown Boveri & Company Limited, Baden, Switzerland

[21] Appl. No.: 692,525

[22] Filed: Jun. 3, 1976

[30] Foreign Application Priority Data

Jul. 4, 1975 Switzerland .................. 8730/75

[51] Int. Cl.² .............................................. F16J 9/00
[52] U.S. Cl. ................................. 277/192; 403/322;
403/288; 415/136; 415/139; 403/28
[58] Field of Search ............... 415/136, 137, 138, 139,
415/217; 277/197, 192, 199; 403/321, 322, 288, 28

[56] References Cited

U.S. PATENT DOCUMENTS

| 1,692,537 | 11/1928 | Baumann | 415/136 |
| 1,722,721 | 7/1929 | Wait | 415/136 |
| 1,873,743 | 8/1932 | Doran | 415/136 |

FOREIGN PATENT DOCUMENTS

| 219,023 | 10/1925 | United Kingdom | 415/136 |
| 229,627 | 1/1926 | United Kingdom | 415/139 |

Primary Examiner—Andrew V. Kundrat
Attorney, Agent, or Firm—Burns, Doane, Swecker & Mathis

[57] ABSTRACT

A combined sealing and guiding arrangement for positioning an inner circular machine part within an outer circular machine part, the parts being for example a stator-blade-carrier for a turbo-machine positioned within an outer casing. The casing and also the stator-blade-carrier consist of two halves which are joined along a horizontal dividing plane, and a sealing ring also consisting of two halves which are joined along that same dividing plane is seated in a groove provided in the periphery of the stator-blade-carrier and clamped against the inner periphery of the casing by means of circumferentially distributed clamping bolts. The lower halves of the outer casing and sealing ring are also provided with aligned grooves in which circumferentially spaced key segments are seated to prevent any relative axial displacement between these two parts.

3 Claims, 3 Drawing Figures

COMBINED SEAL AND GUIDE ARRANGEMENT FOR TWO COAXIALLY ARRANGED MACHINE PARTS

This invention concerns an improved combined sealing and guiding arrangement for two coaxially located machine parts, for example, the stator-blade-carrier in the casing of a turbo-machine, where the arrangement contains a sealing element which consists of two annular halves and which engages an annular groove installed in one of the machine parts.

Sealing arrangements of this type are known in connection with turbo-machine construction, for example to guide and seal diffusers and stator-blade-carriers in the casings. In the case of such arrangement the one and the same machine part should not be subjected simultaneously to great pressure differences and high temperatures since in the case of the former the machine part will tolerate low temperatures only, and in the case of the latter only slight mechanical loads. It was found to be advantageous to distribute the functions thusly that the cooler part, namely the casing in the case of turbo-machines, takes the pressure load while the stator-blade-carrier guides the hot gases and carries the stator blading. The part which is subjected to the greater heat cannot be hindered in its expansion, especially in the radial direction but must still remain pressure-proof. One of the known designs uses two annular halves of the sealing element in the form of integral partitions at one of the parts to be sealed (Book by Traupel "Thermische Turbo-maschinen," Volume II, second edition, published by Springer, Berlin, Heidelberg, New York, 1968, page 342, figure 18.4.7). This arrangement concerns a gas turbine where a liner within the inlet duct is guided at the stuffing box, and a stator-blade-carrier in the casing by means of partitions. The partitions engage grooves which are machined into the corresponding machine parts, allowing a sufficient radial clearance at the base of the groove for thermal expansion. Such arrangement is not only suitable for the absorption of a strong axial thrust but will even improve the seal with the aid of this axial thrust.

It is common practice in modern turbine construction to utilize ever increasing temperatures and pressures in order to increase the power output. The encountered operating temperatures of the outer casings have now reached such magnitudes that the parts undergo thermal deformations due to internal residual stresses being alleviated by the high operating temperatures and causing by their absence said thermal deformations. Also, local temperature peaks can cause a deformation known under the name of "hump." This can lead to difficulties when the assembling and dismantling operations must be carried out repeatedly because the guide assemblies, rigid in axial direction, will not fit together any longer, thus making it necessary to design the stator-blade-carrier-guides at the, preferably pressure-less, side with an increased axial clearance and a discontinuous guide track, with an adverse effect on the tightness.

It is the primary objective of the present invention to provide a sealing and guiding arrangement of the above discussed type which will ensure a seal that is complete throughout the entire contour, even if one or both machine parts become out-of-round due to thermal deformation, and that will still permit an axial movement of the two parts relative to each other.

The invention solves this problem in that the annular halves of the sealing element are forced by means of clamping components against one of the two machine parts which are to be sealed and guided, so as to form a pressure-proof joint and that these halves are fitted without clearance into an annular groove provided on the other machine part.

The invention is particularly advantageous in view of its simplicity and reliability in performing its function; it eliminates power and efficiency losses caused by leakages. The invention allows in most instances subsequent installation of the arrangement in previously manufactured plants.

A preferred embodiment is designed in such manner that one of the annular halves of the sealing element will be axially movable, thus making it possible in the case of two-piece circular machine parts, for example casings with a horizontal diametral dividing plane, to ensure its sealing function even if differences in axial expansion of the lower and upper parts should occur.

It will also be advantageous if the annular halves of the sealing element are made of material that is more elastic relative to the machine parts, and that in the machining state these halves have a diameter which is larger than the diameter that they will assume when placed in the sealing arrangement. The first-mentioned feature enables the annular halves to be joined to the machine part without clearance, and so as to be pressure-proof, while the second feature will make possible their manufacture in a cost-saving manner in that the two annular halves can be produced from a closed one-piece ring, or even from a tube if several sealing elements of identical diameter are required. The diameter of the ring is preferably made larger by the amount that is taken up by the breadth of the separating cuts and the machining of the jointing planes.

The accompanying drawings illustrate one typical embodiment of the invention wherein.

Parts which are not essential for the invention, such as the turbine rotor, the stator blades and the cylindrical part of the stator-blade-carrier, have not been included in order to simplify the disclosure. In the three figures idential parts are denoted by identical reference symbols.

Figure 1:
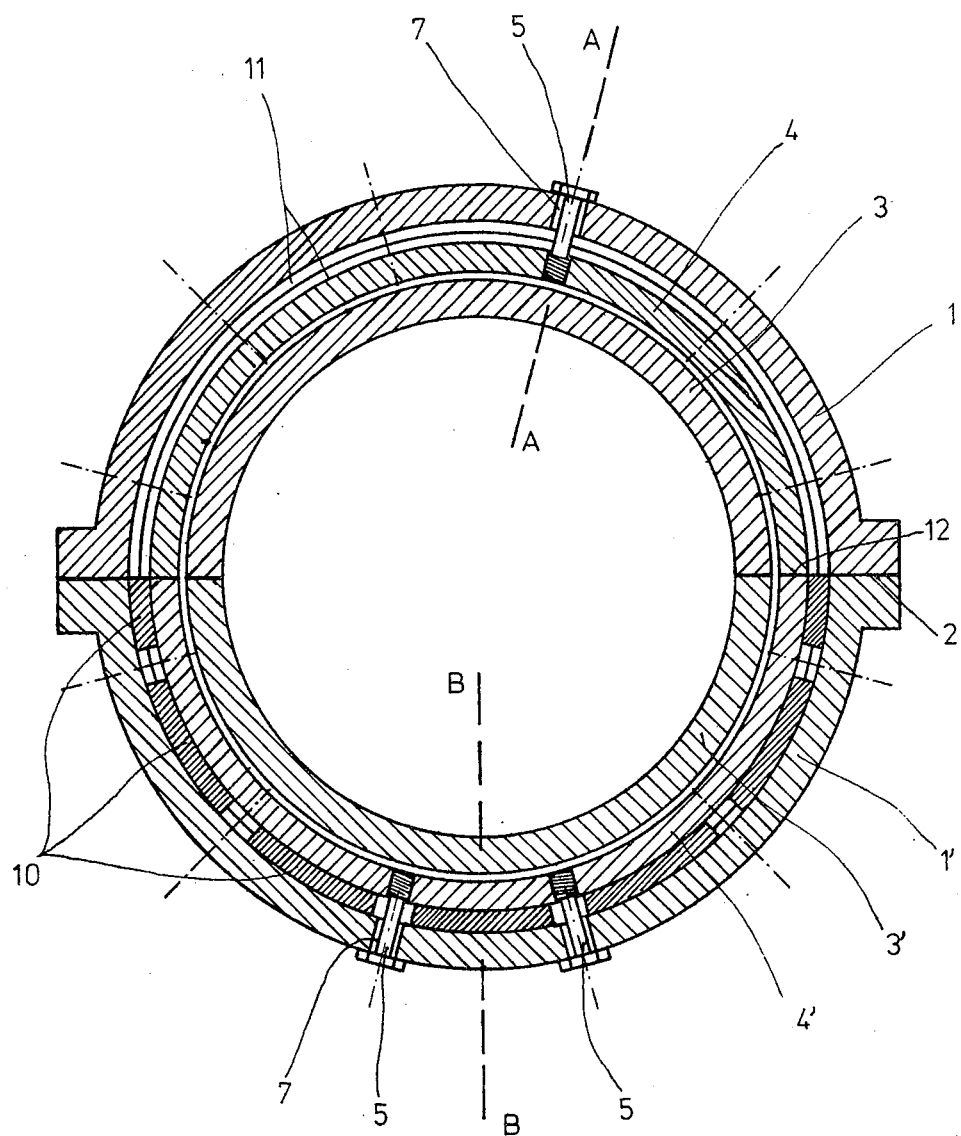
FIG. 1 shows a portion of a turbo-machine in cross section
Figure 2:
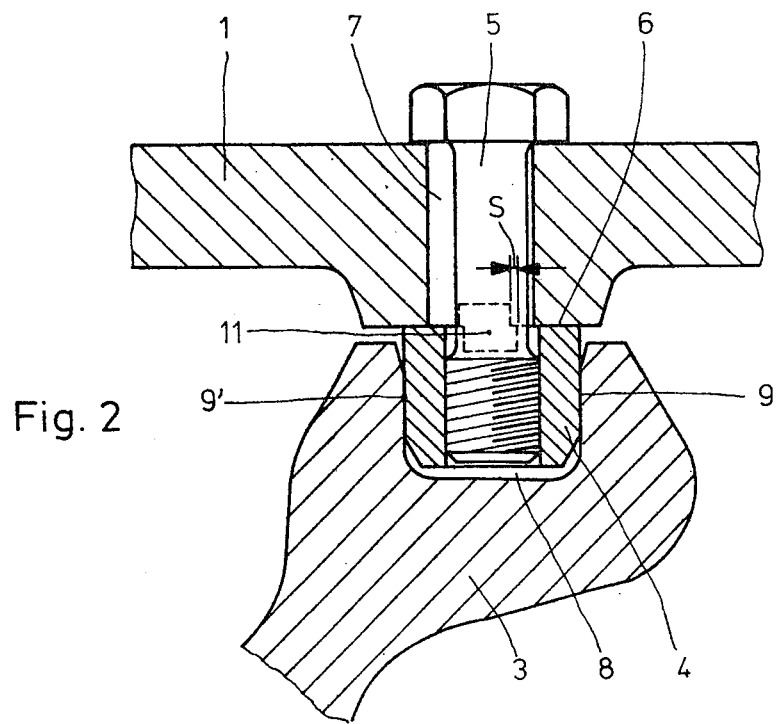
FIG. 2 shows part of a longitudinal section cut along line A—A of FIG. 1, and drawn to a larger scale.
Figure 3:
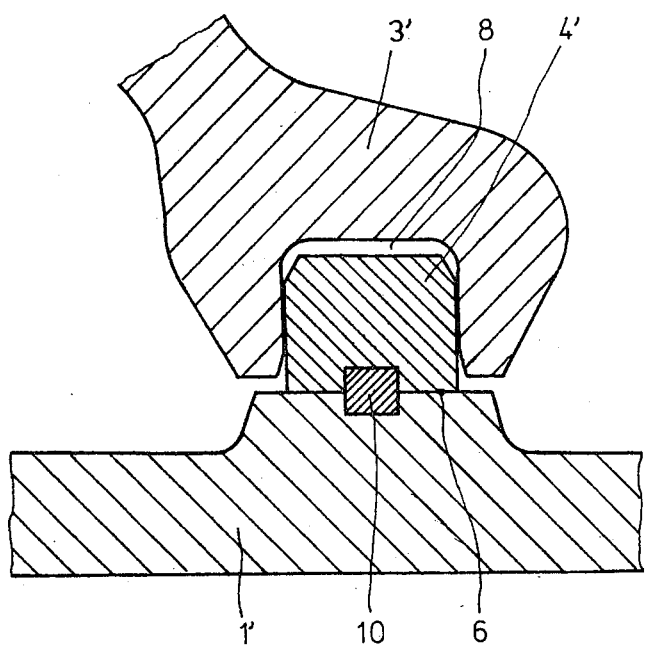
FIG. 3 shows part of a longitudinal section cut along line B—B of FIG. 1, also at a larger scale.

In FIGS. 1, 2, and 3 the numeral 1 denotes the upper half-cylindrical part, and numeral 1' the lower half-cylindrical part of the turbine casing; the two parts are flanged together at a horizontal dividing plane 2. The -only partially illustrated-stator-blade-carrier 3, 3', i.e. the blades themselves are not shown, which is likewise divided horizontally, is arranged concentrically to the turbine casing. The sealing and guiding element in accordance with the invention is horizontally divided like the parts 1, 1' and 3, 3' to be sealed and consists of two identical annular halves 4, 4' of rectangular profile. By means of several clamping elements 5, in the case illustrated six bolts for each annular half uniformly distributed over the circumference, the outer surface 6 of the sealing element, consisting of a relatively elastic material, is forced against the inner circumference of the turbine casing 1, 1' clearance-free and pressure-tight. Titanium or Meehanite for example is used for the sealing ring structure 4, 4' which is more elastic than the material from which the turbine casing 1, 1' and stator-blade-carrier 3, 3' are made. The bolts 5 are located in holes 7, placed radially around the casing with enlarged clearance.

The upper part 3 and the lower part 3' of the stator-blade-carrier are provided with an annular groove 8, its axial width matching the axial reach of the sealing element 4, 4', so that the latter fits snugly to the opposite sides of groove 8 with its plane surfaces 9, 9'. The annular groove 8 is dimensioned depth-wise in such manner that a sufficiently wide radial clearance is available at the base of the groove to allow for thermal expansions. To facilitate installation, the lead-in edges of the stator-blade-carrier as well as of the sealing element are chamfered.

As seen in FIG. 3, the half 4' of the sealing ring is rigidly fastened to the lower half part 1' of the casing, an arrangement which is particularly expedient if the frictional forces between the outer surface 6 of the sealing element and the inner circumferential surface of the casing are not sufficient for the transfer of the axial thrust by the stator-blade-carrier. The fastening, which blocks the axial movement of the lower sealing element 4' relative to the casing, is accomplished by arched key segments 10 which are located within a groove 11, machined into the lower half 4' as well as into the lower half part 1' of the casing. If it is expedient from a production viewpoint, it is also possible to machine the groove 11 into the bolted-together casing parts. This offers the advantage, in addition to reasons based on manufacturing techniques, that at the axially movable half 4 of the sealing ring a greater specific contact pressure will be attained due to the presence of the annular groove 11 in the upper half 1 of the casing which does not carry any key segments, thus influencing advantageously the sealing effect and the resistance to tilting.

The above-mentioned technique can also be applied to the manufacture of the annular groove 11 within the sealing element which can be prepared, as stated, from a closed ring or a tube.

The sealing arrangement proposed by the invention operates in the following manner:

In order to ensure a complete seal during operation, the end faces 12 of the sealing ring halves 4, 4' at the horizontal dividing plane are worked in such a manner that they will be flush with dividing plane 2 of the casing halves 1, 1'. It will be expedient for this process to tighten first the bolts 5 alternatingly, beginning with the center bolts and ending with the bolts at the dividing planes in order to attain a full and thorough contact of the outer surface 6 of the sealing element with the circumferential surface of the casing. Since the sealing ring halves 4, 4' will align themselves during this operation with the inner wall of the housing, it will be possible to produce these halves from a machined ring, its circumference made greater by the amount that is consumed by the breadth of the separating cuts and the material removed by the finishing process. This cannot be accomplished in the case of the known segmental constructions utilizing a great number of loose parts in view of the great number of separating cuts and the staggering of the parts for sealing purposes.

The installed sealing ring halves 4, 4' are in contact with the blade carrier 3, 3' by way of their plane surfaces 9, 9', and with the inner wall of the casing by way of the cylindrical surface 6, and are therefore surrounded primarily by material of the warmer blade carrier 3, 3'. This arrangement will make certain that the temperature of the sealing ring is always somewhat higher than the temperature of the casing, and the dividing planes of the sealing element will therefore always stay very close to each other during operation, thus ensuring a good seal.

The halves 4, 4' of the sealing ring are held within the annular groove 8 of the stator-blade-carrier 3, 3', and their axial position is controlled, due to the rigid fastening in the lower half 1' of the casing, by the latter. If there arises an axial expansion difference S (see FIG. 2) between the upper half 1 of the casing and the lower half 1' of the casing, the axially rigid connection in the lower half 1' will offer superior resistance. Since in the upper half 1 of the casing there are no key segments 10 located between this upper half and the sealing ring half 4, the friction at the contact surface 6 will be overcome forcibly, without a break in the sealing.

When the machine is dismantled, it will be advantageous to slacken (untighten) the radial bolts 5 in the upper half 1 of the casing in order to release tensions between these parts as caused by thermal deformations and to prevent any jamming when lifting the upper half 1 of the casing. The bolts 5 in the lower half 1' of the casing will never be untightened however. The seating of the upper half 1 of the casing during assembly should also be accomplished with the bolts 5 in untightened position to facilitate the sliding of the upper sealing ring half 4 and its insertion into the annular groove 8 of the stator-blade-carrier 3. After the tightening of the — not illustrated — bolts which hold the flanges of the upper and lower halves 1, 1' of the casing together, the bolts 5 holding the sealing element at the upper half 1 of the casing are also tightened, and it will be expedient again to begin at the center and to proceed alternately, ending with the bolts near the dividing planes.

Obviously, the invention is not limited to the species illustrated by drawing. It is possible for example to work the annular groove 8 into the casing rather than the stator-blade-carrier and to arrange the sealing element in such manner that its inner cylindrical surface will rest on the stator-blade-carrier. In order to fasten the sealing ring half 4' axially within the lower half 1' of the casing, it is possible to utilize pins, shearing bushings or the like in place of the illustrated arched key segments 10. It is even feasible to replace the clamping elements 5 in the lower half 1' of the casing as well as the keys 10, used for axial blockage, by welded connections; however, this would require a suitable "lip" welding and avoiding any possible deformation caused by the welding.

In conclusion it can be stated that the sealing arrangement of two coaxial machine parts, as proposed by the invention, will not hinder the radial and axial thermally induced movability of these parts but will ensure that these parts remain pressure-tight.

I claim:

1. In a combined sealing and guiding arrangement for positioning an inner circular machine part within an outer circular machine part, the parts being for example a stator-blade-carrier for a turbo-machine which is positioned within an outer casing and wherein said outer machine part consists of two halves joined together along a horizontal dividing plane and said inner machine part also consists of two halves which meet along said horizontal plane, the improvement which comprises an annular sealing ring consisting of two halves meeting together along said horizontal plane, means for clamping both halves of said sealing ring against the respective halves of one of said machine parts in a pressure-tight manner and the halves of the other machine part being provided with a groove in which said sealing ring is seated substantially without clearance, and means preventing axial displacement of one of the halves of said sealing ring in relation to that half of said machine part which is not provided with the groove in which said sealing ring is seated, the other sealing ring half being axially displaceable.

2. A combined sealing and guiding arrangement for two circular machine parts as defined in claim 1 wherein said means for preventing axial displacement of one half of said sealing ring is comprised of a series of key segments seated in oppositely disposed grooves in said sealing ring half and said machine part half.

3. A combined sealing and guiding arrangment for two circular machine parts as defined in claim 1 wherein said inner machine part is provided with the said groove in which said sealing ring is seated.

* * * * *